(12) United States Patent
Gabbay

(10) Patent No.: US 8,383,995 B2
(45) Date of Patent: Feb. 26, 2013

(54) FLEXIBLE HOT PLATE AND COOKING UNIT

(75) Inventor: Raphael Gabbay, Jerusalem (IL)

(73) Assignee: Raphael Gabbay, Jerusalem (IL)

( * ) Notice: Subject to any disclaimer, the term of this patent is extended or adjusted under 35 U.S.C. 154(b) by 375 days.

(21) Appl. No.: 12/614,136

(22) Filed: Nov. 6, 2009

(65) Prior Publication Data

US 2010/0116818 A1 May 13, 2010

(30) Foreign Application Priority Data

Nov. 13, 2008 (IL) ............................................ 195268
Nov. 4, 2009 (IL) ............................................ 201933

(51) Int. Cl.
*H05B 3/34* (2006.01)
*H05B 3/10* (2006.01)

(52) U.S. Cl. ........ 219/528; 219/529; 219/211; 219/212; 219/544; 219/545; 219/548; 219/549; 219/552; 219/553; 219/458.1

(58) Field of Classification Search .............. 219/211–2, 219/528–9, 544–5, 548–9, 553–3, 458.1
See application file for complete search history.

(56) References Cited

U.S. PATENT DOCUMENTS 7,439,474 B2 * 10/2008 Huang ........................... 219/549
2008/0245784 A1 * 10/2008 Lawrence et al. .......... 219/458.1

* cited by examiner

*Primary Examiner* — Shawntina Fuqua
(74) *Attorney, Agent, or Firm* — Lucas & Mercanti, LLP

(57) ABSTRACT

The invention provides a flexible hot plate and cooking unit, with a temperature differential of at least 40° C. between the two sides of the unit comprising a heating element sandwiched between an upper and a lower layer of flexible material wherein said upper layer provides a temperature along its upper surface of at least 80° C. for heating an object placed thereon, and said lower layer is provided with a plurality of insulating air passages.

8 Claims, 4 Drawing Sheets

FLEXIBLE HOT PLATE AND COOKING UNIT

CROSS-REFERENCE TO RELATED APPLICATIONS

This application claims the benefit of priority from Israeli Patent Application Serial Numbers 195,268 filed Nov. 13, 2008 and 201,933 filed Nov. 4, 2009, the contents of which are incorporated herein by reference.

FIELD OF THE INVENTION

The present invention relates to a hot plate and cooking unit which can be designed and used as a buffet warming tray for keeping one or more food items at a desired temperature or a portable cooker for travelers. More particularly, the present invention relates to a light weight flexible hot plate and cooking unit which can be folded or rolled up for compact storage when not in use.

BACKGROUND OF THE INVENTION

The classic hot plate with which one is familiar is usually large, rigid and bulky. The invention described below will change the concept of how this product can be used and stored.

In the prior art there are many patents for flexible heating devices, most of them concerning low-temperature applications such as deicing, blankets and car seats, unfreezing pipes and for medical and body warming applications. There are also heating devices for keeping food warm, however no publications were found concerning a flexible cooking device or warming tray for maintaining hot food at a temperature of at least 80° C., with a temperature differential of at least 40° C. between top and bottom surfaces, which enables the placement of the flexible heater on any desired surface.

In U.S. Pat. No. 5,408,068 there is described and claimed an electric heater for use in a vehicle to heat a container of food or beverage, comprising a flexible jacket to be wrapped around a container to be heated, and in U.S. Pat. No. 3,657,517 there is described and claimed an elongate, flexible, resilient, split-sleeve resistance heater structure, however neither of said patents teaches or suggests a flexible hot plate having the above characterizing features.

SUMMARY OF THE INVENTION

This new hot plate and cooking unit is light weight, safe, aesthetic, easy to clean and can be rolled up or folded for easy storage. It has a heat source that disperses heat evenly over its surface and optionally provides a variance of temperatures. In addition, despite its thinness, it will not heat surfaces upon which it is placed more than to slight warmth which is easily tolerable to human touch, and poses no risk to the surface on which it is placed, as a result of the plurality of insulating air passages incorporated into the lower material thereof.

Thus, according to the present invention, there is now provided a flexible hot plate and cooking unit, with a temperature differential of at least 40° C. between the two sides of the unit comprising a heating element sandwiched. i.e. placed between, between an upper and a lower layer of flexible material wherein said upper layer provides a temperature along its upper surface of at least 80° C. for heating an object placed thereon, and said lower layer is provided with a plurality of air-insulting passages.

Preferably, said upper layer has a thickness of about 0.5-5 mm.

In especially preferred embodiments of the present invention, said flexible material is silicone.

In preferred embodiments of the present invention said lower layer has a thickness of about 5-35 mm.

Preferably said lower layer further comprises a plurality of insulating air-passages designed to allow air cooling underneath said hot plate wherein said air passages are formed between a plurality of inverted conical legs provided on the underside of said unit.

In this context it is to be noted that it has been found that a lower layer of flexible material such as foamed or rolled silicone, even when having a thickness of 6 to 10 times as great as the thickness of the upper layer, does not and cannot provide sufficient insulation and protection of the surface upon which the unit is placed when the unit is used at the preferred temperatures of between 80° C. and 180° C. for an extended period of time.

In especially preferred embodiments of the present invention said heating element is in the form of an array of heating wires or foil.

In preferred embodiments of the present invention, said heating element is in the form of an array of heating wires, foil or any form known to those skilled in the art may also be used.

Preferably the heat load of said heating element is around 0.25-0.2× watt/cm² with 0.1 being the optimum.

In other preferred embodiments of the present invention there is provided a flexible hot plate and cooking unit, with a temperature differential of at least 40° C. between the two sides of the hot plate comprising a heating element inserted in a silicone sheet, wherein said upper and lower surfaces are of a single piece of silicone with the heating element inserted therein before the formation thereof and wherein said upper layer provides a temperature along its upper surface of at least 80° C., and said lower layer is provided with a plurality of air-insulting passages.

In especially preferred embodiments of the present invention, said flexible hot plate and cooking unit is concentrically rollable around itself for compact storage.

The invention is available in different sizes depending on its end use. The standard sizes of most hot plates are between 20 to 60 cm width or length. Smaller personal hot plates are also made in sizes between 10 to 20 cm width or length. Bigger hot plates for non personal use are also made in sizes between 60-120 cm width or length. Thicker versions are designed to stand higher temperatures.

As will be described hereinafter, in an especially preferred embodiment of the present invention, the temperature differential is produced by a combination of silicone preferably designed in a unique structure to allow air cooling. It can be assembled by a sandwiched heating element between a top thin silicone sheet, and a bottom silicone sheet with the air cooling structure or as a one piece silicone injected or molded configuration with the heating element inserted before injection or molding, which includes a spacer structure design to allow air cooling design below bottom surface as described before (this time all in one piece) the arrangement being such that upon activation of said heating element, said upper layer provides a temperature along its upper surface of at least 80° C., and said lower layer provides a temperature lower at least by 40° C.

The top sheet is relatively thin so as to reach a high heat transfer factor, and to reach a high enough temperature. The ideal thickness for this layer is between 0.5-2 mm.

By way of example, the bottom sheet is a silicone sheet with a thickness of 5-35 mm. The sheet acts as a thermal and electrical insulator and therefore is made from silicone and designed with a plurality of insulating air passages designed to allow air cooling. The insulation reduces heat transfer rate to a degree where the bottom surface of the hot plate is at least 40° C. lower than the heat generated from the top surface which is at least 80° C.

These wires are set in an orderly fashion between the two layers or inserted before the injection/molding process. The wires which can be in the form of foil, or integrated in a flexible PCB (printed circuit board) can be made of such materials as Nichrome™ or other resistance alloys. The design heat load is around 0.25 to 0.2× Watt/cm$^2$ preferably 0.1× Watt/cm$^2$.

According to the invention, in the "layer version" the layers of the hot plate are held together by a layer of a heat resistant adhesive, which is spread evenly over the wires and the silicone layer supporting the same.

These methods of lamination are to be deemed exemplary only and are not intended to limit the invention. Other methods of lamination known to persons skilled in the art may also be used. The hot plate can also be made by laminating the polymers together or mechanically attaching them to one another. If the case is of a "one piece" compression molded or injected hot plate, there may not be a need for an adhesive.

The heating wire or foil inside the layers connects to standard silicone coated electric wires (diameter 0.5-1.5 mm) and then to a standard cable and plug.

In upscale models the cable includes an on/off switch and a light source to indicate when the heating element is powered.

A graphic illustration may be printed over the top thin silicone layer using silicone based colors, or by molding or by any other form of printing known to those skilled in the art.

DETAILED DESCRIPTION OF THE INVENTION

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
FIG. 1 is a perspective view of a preferred embodiment of the hot plate and cooking unit according to the invention with electric accessories in an "unrolled" mode.

Referring now to FIG. 1 there is seen a perspective view of a preferred embodiment of the hot plate and cooking unit 10 according to the invention with electric accessories in an "unrolled" mode.

Figure 2:
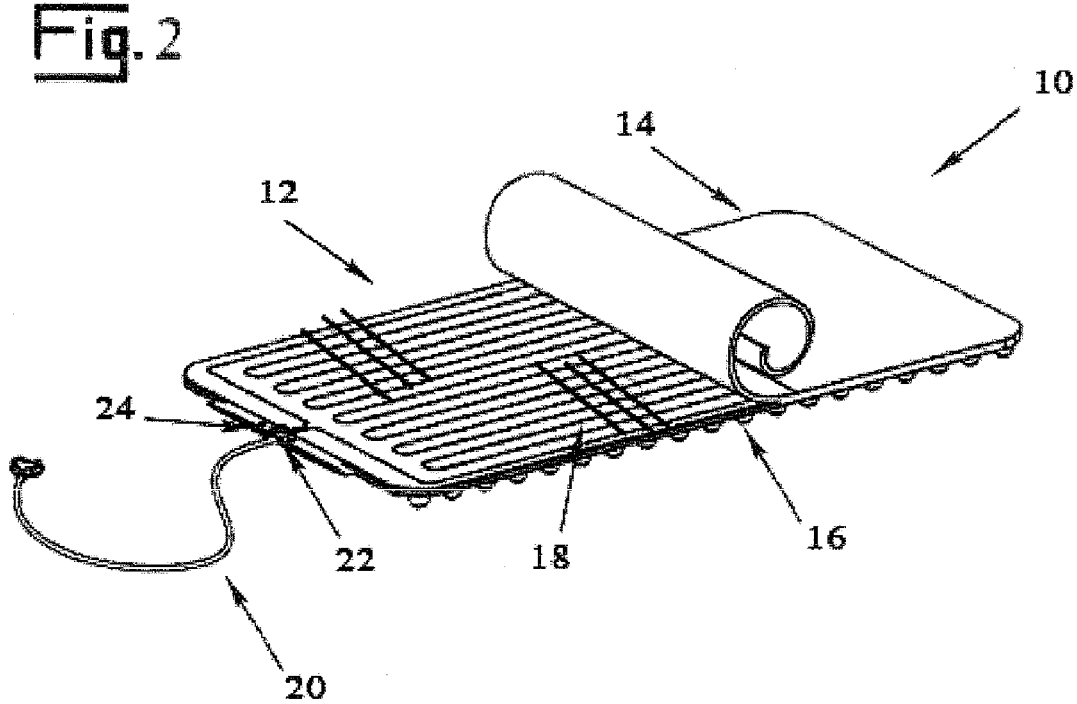
FIG. 2 is a perspective view of the same embodiment in which the top layer is slightly rolled to expose sandwiched heating element and layers.

Referring now to FIG. 2 there is seen a flexible hot plate and cooking unit 10 comprising a heating element 12 sandwiched between an upper 14 and a lower 16 layer, preferably formed from a silicone material. The upper layer 14 is thinner than the lower layer 16 or can have different insulative capabilities. The arrangement is such that upon activation of the heating element 12, the upper layer 14 provides a temperature along its upper surface of at least 80° C., and the lower layer 16 provides a temperature along its bottom of at least 40° C. lower than the temperature of the upper surface 14. A standard electric cable 20 connectable to a mains outlet supplies power to a heating element 12

The upper and lower layers 14, 16 are preferably made from a silicone material, the upper layer 14 can have a thickness of about 0.5-2 mm, while the lower layer 16 is silicone having a thickness of about 4-35 mm.

Figure 7:
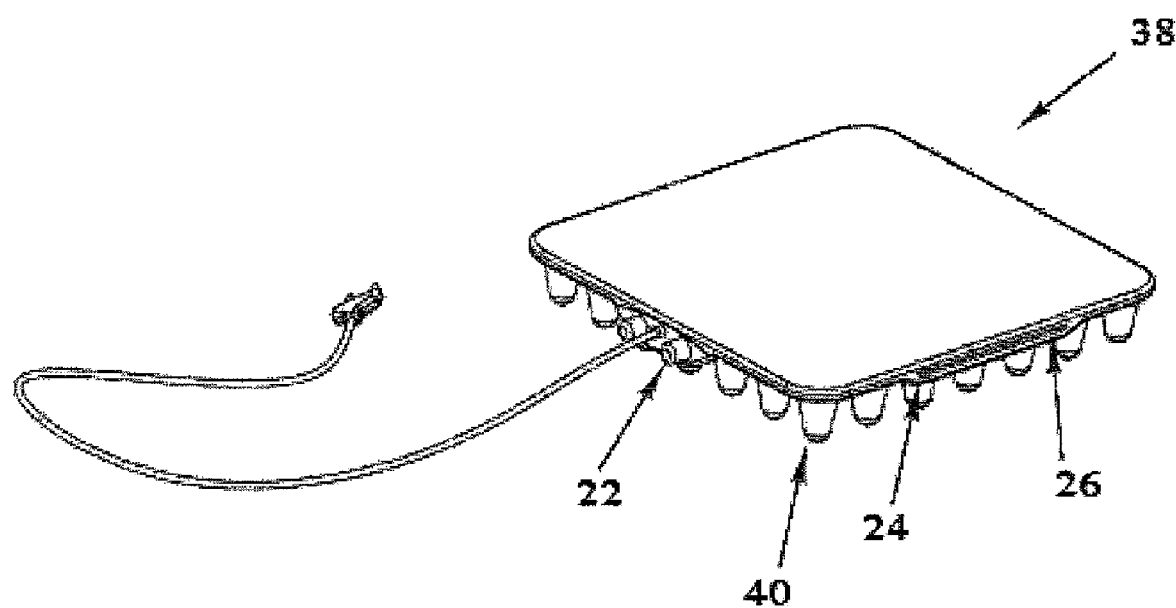
FIG. 7 is a perspective view of an embodiment of a compact version with a thicker spacer structure for insulation when using very high temperatures.

The heating element 12 is in the form of an array of thin heating wires or a foil possibly integrated into a flexible PCB (printed circuit board), placed between the two layers 14, 16 in an orderly manner to achieve an even heat load of around 0.1 watt/cm$^2$. In case the hot plate is manufactured in a layer method, a silicone adhesive 18 is applied between the upper and lower layers 14, 16 to retain the heating element 12 in the desired position. The silicone adhesive 18 serves also to join the upper and lower layers 14, 16 making a complete unit. In certain models an electric cable 20 is connected to an on/off switch 22 and a light source such as a LED 24 which indicates whether or not the heating element 12 is powered. These two components 22, 24 can conveniently be incorporated into an electric cable 20 or to the silicone body as seen in FIG. 7 while the LED illuminates through a transparent strip of silicone 26.

With regard to the rest of the figures, similar reference numerals have been used to identify similar parts.

Figure 3:
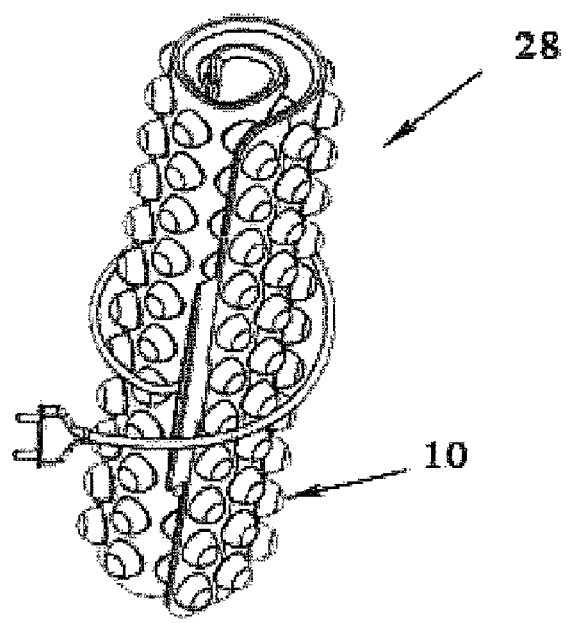
FIG. 3 is a perspective view of the same embodiment rolled up for compact storage.

Referring now to FIG. 3, there is seen the flexible hot plate and cooking unit 10 described in the previous figure rolled up 28 for compact storage.

Figure 4:
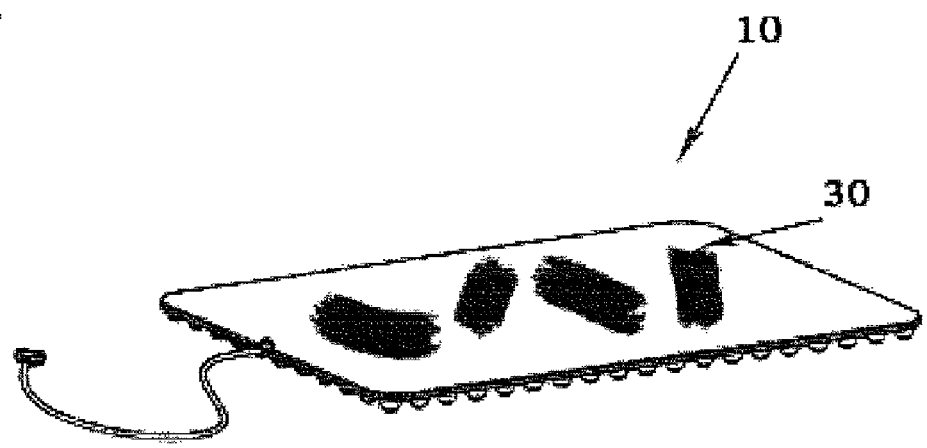
FIG. 4 is a perspective view of the same hot plate as in FIG. 1 but includes printing on the upper surface thereof.

FIG. 4 illustrates a perspective view of the same hot plate and cooking unit 10 as in FIG. 1 but includes printing on upper surface 30.

The thin upper layer 32 can be fiberglass reinforced silicone to better resist wear.

The upper surface of the hot plate and cooking unit 10 carries an illustration or text 30 which can be applied by means of silicone based colors printing or any other method which will print on silicone.

Figure 5:
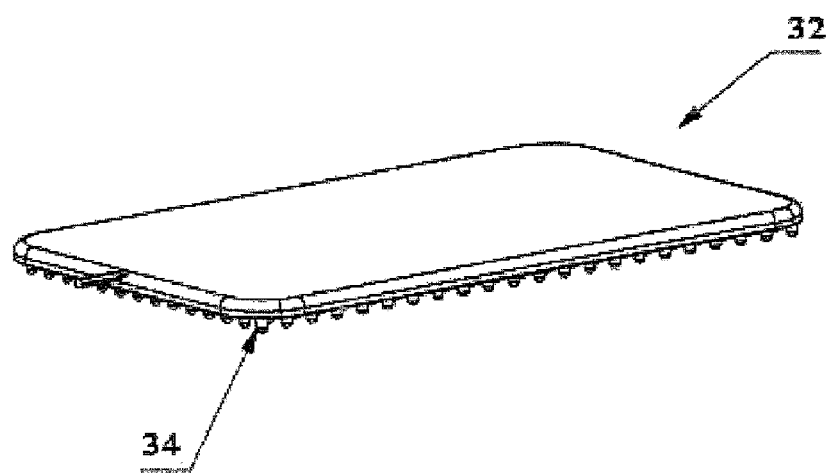
FIG. 5 is a perspective view of a "one piece" Silicone injected hot plate and cooking unit which includes a foil or wire heating element sandwiched therebetween and in which the bottom of the hot plate and cooking unit is designed with air passages for air cooling.

FIG. 5 illustrates a "one piece" silicone injected or compression molded hot plate and cooking unit 32 which includes a foil or wire heating element 12 (seen in FIG. 6) sandwiched between the layers 14 and 16. The bottom layer 16 of the hot plate and cooking unit is designed to incorporate insulating air passages, in a preferred configuration of a plurality of inverted conical legs 34 for air cooling and the upper layer remains thin and close to the heating element 12.

Figure 6:
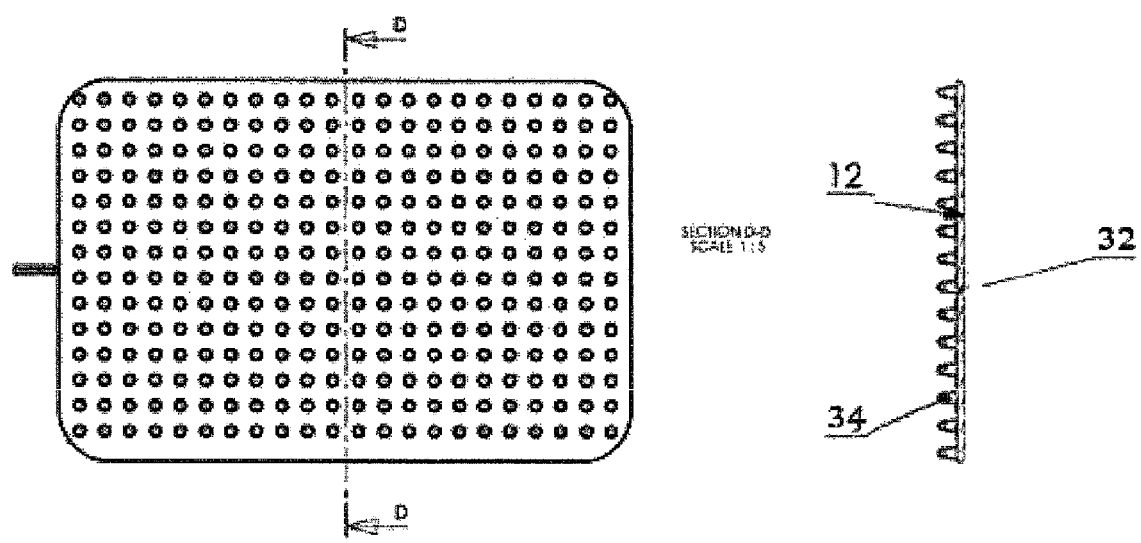
FIG. 6 is a section view of the hot plate and cooking unit shown in FIG. 7

Referring now to FIG. 6, there is seen a section view 36 of the "one piece" hot plate and cooking unit 36 of FIG. 5, with a bottom spacer design of inverted conical legs 34 and sandwiched heating element 12 as described in the previous figure.

Referring now to FIG. 7. there is seen a perspective view of an embodiment of a compact version of the hot plate and cooking unit 38 with a thicker spacer structure 40 for insulation in very high temperatures while the LED 24, switch 22, and temperature sorter 42 are inserted in the silicone body. The LED illuminates through a transparent silicone strip 26 inserted into the hot plate and cooking unit.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A flexible hot plate and cooking unit with a first side and a second side, comprising:
    an upper layer having an upper surface directed toward said first side;
    a lower layer of flexible material having a plurality of inverted conical legs extending toward said second side of said hot plate and said cooking unit and a plurality of insulating air passages formed between said inverted conical legs; and
    a heating element sandwiched between said upper layer and said lower layer of flexible material;
    wherein said upper layer provides a temperature along said upper surface of said upper layer of at least 80° C. for heating an object placed thereon, and
    wherein said hot plate and said cooking unit has a temperature differential of at least 40° C. between said first side and said second side of the hot plate and cooking unit.

2. The flexible hot plate and cooking unit according to claim 1, wherein said flexible material is silicone.

3. The flexible hot plate and cooking unit according to claim 1, wherein said upper layer has a thickness of about 0.5-5 mm.

4. The flexible hot plate and cooking unit according to claim 1, wherein said lower layer has a thickness of about 5-35 mm.

5. The flexible hot place and cooking unit according to claim 1, wherein said upper layer provides a temperature along said upper surface of between 80° C. and 180° C.

6. The flexible hot plate and cooking unit according to claim 1, wherein said heating element is an array of heating wires or foil.

7. The flexible hot plate and cooking unit according to claim 1, wherein said heating element has a heat load of around 0.25-0.2 watt/cm$^2$.

8. The flexible hot plate and cooking unit according to claim 1, wherein said conical legs are exposed to an environment.

* * * * *